US012027782B2

(12) United States Patent
Lin et al.

(10) Patent No.: US 12,027,782 B2
(45) Date of Patent: Jul. 2, 2024

(54) ELECTRONIC DEVICE

(71) Applicant: WISTRON NEWEB CORPORATION, Hsinchu (TW)

(72) Inventors: Hsieh-Chih Lin, Hsinchu (TW); Shih-Hsien Tseng, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 432 days.

(21) Appl. No.: 17/153,045

(22) Filed: Jan. 20, 2021

(65) Prior Publication Data

US 2021/0351509 A1 Nov. 11, 2021

(30) Foreign Application Priority Data

May 7, 2020 (TW) ................................ 109115256

(51) Int. Cl.
*H01Q 1/38* (2006.01)
*H01Q 5/314* (2015.01)

(52) U.S. Cl.
CPC ............... *H01Q 5/314* (2015.01); *H01Q 1/38* (2013.01)

(58) Field of Classification Search
CPC .......... H01Q 5/314; H01Q 1/38; H01Q 1/245; H01Q 5/328; H01Q 5/371; H01Q 5/378; H01Q 9/0421
See application file for complete search history.

(56) References Cited

U.S. PATENT DOCUMENTS

| | | | | |
|---|---|---|---|---|
| 8,577,289 | B2 | 11/2013 | Schlub et al. | |
| 9,502,768 | B2 | 11/2016 | Huang | |
| 9,608,331 | B1 * | 3/2017 | Rowson | H01Q 1/245 |
| 2010/0141536 | A1 * | 6/2010 | Zhang | H01Q 1/38 343/702 |
| 2012/0319918 | A1 * | 12/2012 | Ramachandran | H01Q 9/0442 333/124 |
| 2013/0257679 | A1 | 10/2013 | Wong et al. | |

(Continued)

FOREIGN PATENT DOCUMENTS

| | | | |
|---|---|---|---|
| CN | 103178331 | A | 6/2013 |
| CN | 104795622 | A | 7/2015 |

(Continued)

*Primary Examiner* — Dieu Hien T Duong
*Assistant Examiner* — Michael M Bouizza
(74) *Attorney, Agent, or Firm* — McClure, Qualey & Rodack, LLP

(57) ABSTRACT

An electronic device including an antenna structure and a switching circuit is provided. The antenna structure includes a first radiating element, a second radiating element, a feeding element and a grounding element. The first radiating element incudes a first radiating part and a feeding part. The second radiating element is coupled with the first radiating element, and includes a main body and an arm that is electrically connected to the switching circuit. The feeding element includes a feeding end electrically connected to the feeding part, and a grounding end electrically connected to the grounding element. The antenna structure generates a first operation bandwidth and second operation bandwidth when the switching circuit is switched to a first and second mode, respectively. A central frequency of the first operation bandwidth is different from that of the second operation bandwidth.

6 Claims, 14 Drawing Sheets

(56) References Cited

U.S. PATENT DOCUMENTS

| | | | | |
|---|---|---|---|---|
| 2015/0145744 | A1* | 5/2015 | Kao | H01Q 9/0421 343/852 |
| 2015/0171911 | A1* | 6/2015 | Yang | H04W 4/80 455/280 |
| 2015/0280319 | A1* | 10/2015 | Yeh | H01Q 5/378 343/749 |
| 2016/0336643 | A1* | 11/2016 | Pascolini | H01Q 9/0421 |
| 2016/0373151 | A1* | 12/2016 | Yang | H04W 4/80 |
| 2018/0083353 | A1* | 3/2018 | Tseng | H01Q 1/245 |
| 2019/0020111 | A1* | 1/2019 | Tseng | H01Q 5/328 |
| 2022/0021408 | A1* | 1/2022 | Yen | H04B 1/3838 |

FOREIGN PATENT DOCUMENTS

| | | | |
|---|---|---|---|
| TW | 201230493 | A1 | 7/2012 |
| TW | M460421 | U | 8/2013 |

* cited by examiner

ELECTRONIC DEVICE

CROSS-REFERENCE TO RELATED PATENT APPLICATION

This application claims the benefit of priority to Taiwan Patent Application No. 109115256, filed on May 7, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an electronic device, and more particularly to an electronic device which has an antenna structure having operation bandwidths applicable for the fourth generation technology standard for cellular networks and the fifth generation technology standard for cellular networks.

BACKGROUND OF THE DISCLOSURE

With the development of the fourth generation technology standard for cellular networks (4G) and the fifth generation technology standard for cellular networks (5G), design of antenna structures in conventional electronic devices can no longer meet the requirements of the operation bandwidth of 5G.

Moreover, since electromagnetic waves emitted by antennas affect human bodies, the International Commission on Non-Ionizing Radiation Protection (ICNIRP) advises that the specific absorption rate (SAR) value per unit mass of an organism to electromagnetic wave energy should not exceed 2.0 W/kg. The Federal Communications Commission (FCC) also advises that the SAR value should not exceed 1.6 W/kg. However, most of the conventional technologies that enhance the efficiency of the antennas lead to an increased SAR value.

Therefore, it has become an important issue for the industry to overcome the above-mentioned defect through improving designs of the electronic devices.

SUMMARY OF THE DISCLOSURE

In response to the above-referenced technical inadequacies, the present disclosure provides an electronic device.

In one aspect, the present disclosure provides an electronic device including an antenna structure and a switching circuit. The antenna structure includes a first radiating element, a second radiating element, a feeding element, and a grounding element. The first radiating element includes a first radiating part and a feeding part that is electrically connected to the first radiating part. The second radiating element is coupled with the first radiating element, and the second radiating element includes a main body and an arm that is electrically connected to the main body. The feeding element includes a feeding end and a grounding end, and the feeding end is electrically connected to the feeding part. The grounding element is electrically connected to the grounding end. The arm is electrically connected to the switching circuit. When the switching circuit is switched to a first mode, the antenna structure generates a first operation bandwidth, and when the switching circuit is switched to a second mode, the antenna structure generates a second operation bandwidth. A central frequency of the first operation bandwidth generated through the first mode is different from another central frequency of the second operation bandwidth generated through the second mode.

In another aspect, the present disclosure provides an electronic device including an antenna structure, a switching circuit, at least one inductor, and a proximity sensing circuit. The antenna structure includes a first radiating element, a second radiating element, a feeding element, and a grounding element. The first radiating element includes a first radiating part, a second radiating part, a feeding part, and a grounding part, a first end of the feeding part is electrically connected to the second radiating part, and a first end of the grounding part is electrically connected to the first radiating part. The second radiating element is coupled with the first radiating element, and the second radiating element includes a main body and an arm that is electrically connected to the main body. The feeding element includes a feeding end and a grounding end, and the feeding end is electrically connected to a second end of the feeding part. The grounding element is electrically connected to the grounding end, and a second end of the grounding part is electrically connected to the grounding element. The arm is electrically connected to the switching circuit. When the switching circuit is switched to a first mode, the antenna structure generates a first operation bandwidth, and when the switching circuit is switched to a second mode, the antenna structure generates a second operation bandwidth. A central frequency of the first operation bandwidth generated through the first mode is different from another central frequency of the second operation bandwidth generated through the second mode. The at least one inductor is connected in series between the first radiating element and the proximity sensing circuit.

In yet another aspect, the present disclosure provides an electronic device including an antenna structure, a switching circuit, at least one inductor, and a proximity sensing circuit. The antenna structure includes a first radiating element, a second radiating element, a feeding element, and a grounding element. The first radiating element includes a first radiating part, a second radiating part, and a feeding part, and the feeding part is electrically connected to the first radiating part and the second radiating part. The second radiating element is coupled with the first radiating element, and the second radiating element incudes a main body, a first arm that is electrically connected to the main body, and a second arm that is electrically connected to the main body. The first radiating part of the first radiating element and the main body of the second radiating element are separated from and coupled with each other. The feeding element includes a feeding end and a grounding end, and the feeding end is electrically connected to the feeding part. The grounding element is electrically connected to the grounding end. The first arm is electrically connected to the switching circuit. When the switching circuit is switched to a first mode, the antenna structure generates a first operation bandwidth, and when the switching circuit is switched to a second mode, the antenna structure generates a second operation bandwidth. A central frequency of the first operation bandwidth generated through the first mode is different from another central frequency of the second operation bandwidth generated through the second mode. The at least one inductor is connected in series between the second arm and the proximity sensing circuit.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings in which.

DETAILED DESCRIPTION OF THE EXEMPLARY EMBODIMENTS

Figure 1:
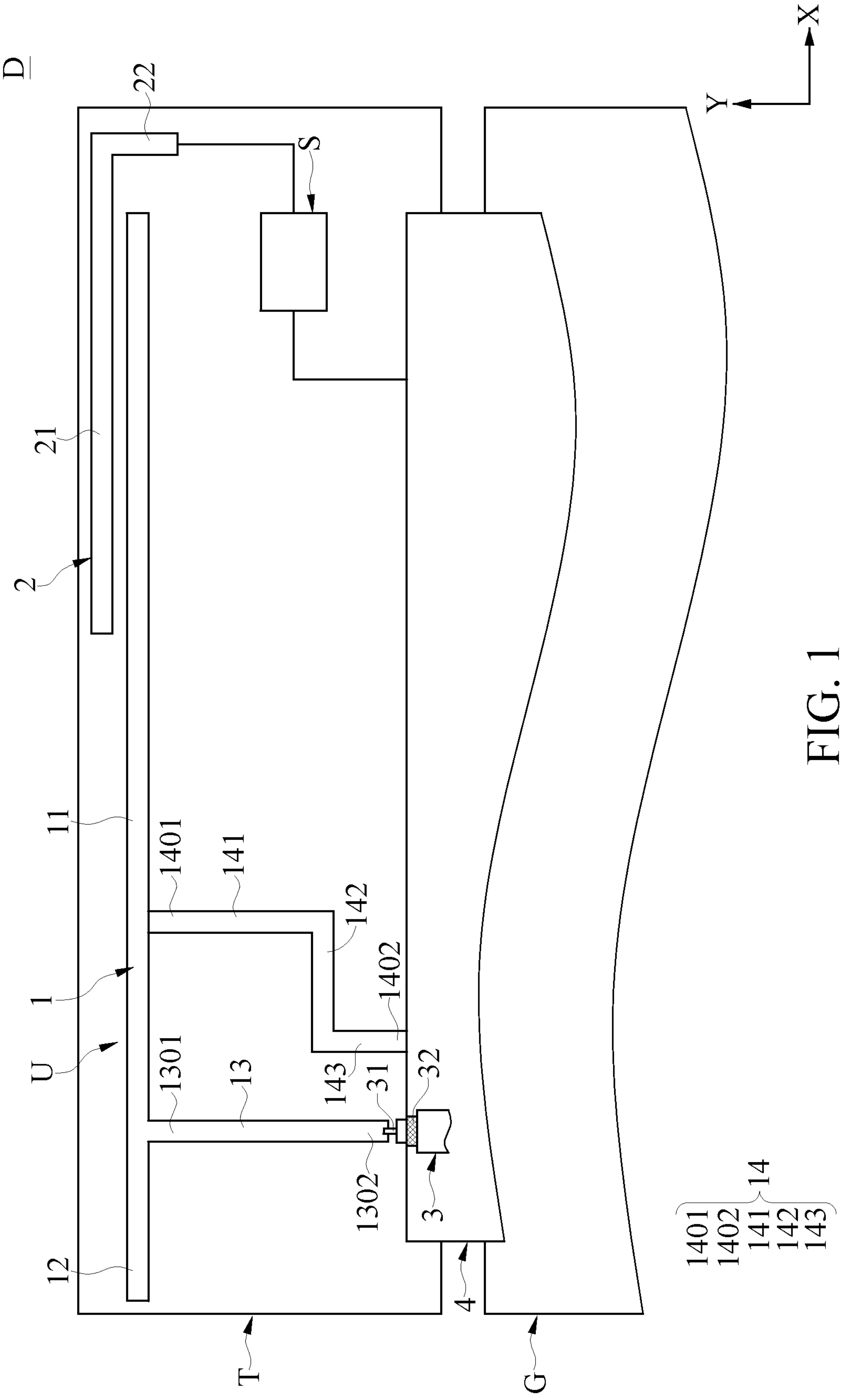
FIG. 1 is a top schematic view of an electronic device in a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of “a”, “an”, and “the” includes plural reference, and the meaning of “in” includes “in” and “on”. Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as “first”, “second” or “third” can be used to describe various components, signals or the like, which are for distinguishing one component/signal from another one only, and are not intended to, nor should be construed to impose any substantive limitations on the components, signals or the like. In addition, the term “connect” used herein refers to a physical connection between two elements, which can be a direct connection or an indirect connection. The term “couple” used herein refers to two elements being separated and having no physical connection, and an electric field generated by a current of one of the two elements excites that of the other one.

First Embodiment

Reference is made to FIG. 1, which is a top schematic view of an electronic device in a first embodiment of the present disclosure. The first embodiment of the present disclosure provides an electronic device D including an antenna structure U and a switching circuit S. The switching circuit S is electrically connected to the antenna structure U, such that the switching circuit S can be utilized to adjust an operation bandwidth, an impedance matching, a value of return loss, and/or an efficiency of radiation generated by the antenna structure U. Moreover, more preferably, the electronic device D can further include a substrate T, and the antenna structure U and the switching circuit S can be disposed on the substrate T.

The antenna structure U includes a first radiating element 1, a second radiating element 2, a feeding element 3, and a grounding element 4. The first radiating element 1, the second radiating element 2, the feeding element 3, and the grounding element 4 can be disposed on the substrate T. the feeding element 3 is electrically connected between the first radiating element 1 and the grounding element 4, and the first radiating element 1 and the second radiating element 2 are separated from and coupled with each other. For example, the first radiating element 1 includes a first radiating part 11 and a feeding part 13 that is electrically connected to the first radiating part 11, the second radiating element 2 includes a main body 21 and an arm 22 that is electrically connected to the main body 21, and the first radiating part 11 of the first radiating element 1 and the main body 21 of the second radiating element 2 are separated from and coupled with each other, such that the first radiating element 1 is coupled with and excites the second radiating element 2. In addition, the feeding element 3 includes a feeding end 31 and a grounding end 32, the feeding end 31 is electrically connected to the feeding part 13, and the grounding end 32 is electrically connected to the grounding element 4. In one of the implementations, the grounding element 4 can be electrically connected to a metal element G, and the metal element G can be a casing of the electronic device D, but the present disclosure is not limited thereto.

The electronic device D can be a hybrid laptop (a 2-in-1 laptop), and the metal element G can be the back cover of the hybrid laptop, but the present disclosure is not limited thereto. Moreover, for example, the first radiating element 1, the second radiating element 2, and the grounding element 4 can be a metal sheet, a metal wire or other conductive materials that are electrically conductive, the feeding element 3 can be a coaxial cable, the substrate T can be a flame retardant 4 (FR4) substrate, a printed circuit board (PCB), or a flexible printed circuit board (FPCB), but the present disclosure is not limited thereto.

Furthermore, the arm 22 of the second radiating element 2 is electrically connected to the switching circuit S. For example, when the switching circuit S is switched to a first mode, the antenna structure U generates a first operation bandwidth, and when the switching circuit S is switched to a second mode, the antenna structure U generates a second operation bandwidth, but the present disclosure is not limited thereto. In addition, a central frequency of the first operation bandwidth generated through the first mode is different from another central frequency of the second operation bandwidth generated through the second mode. That is to say, the switching circuit S can be utilized to control the operation bandwidth of the antenna structure U.

Reference is further made to FIG. 1. The first radiating element 1 of the antenna structure U can further include a second radiating part 12 and a grounding part 14. Specifically, in the first embodiment, the electronic device D includes the antenna structure U and the switching circuit S, and the antenna structure U is electrically connected to the switching circuit S. The antenna structure U includes the first radiating element 1, the second radiating element 2, the feeding element 3, and the grounding element 4. The first radiating element 1 includes the first radiating part 11, the second radiating part 12, the feeding part 13, and the grounding part 14. A first end 1301 of the feeding part 13 is electrically connected to the second radiating part 12 and the first radiating part 11, a first end 1401 of the grounding part 14 is electrically connected to the first radiating part 11, and a second end 1402 of the grounding part 14 is electrically connected to the grounding element 4. In addition, the second radiating element 2 is coupled with the first radiating element 1 and separated from the first radiating element 1, the second radiating element 2 includes the main body 21, and the arm 22 that is electrically connected to the main body 21, and the arm 22 is electrically connected to the switching circuit S. In addition, the feeding element 3 includes the feeding end 31 and the grounding end 32, the feeding end 31 is electrically connected to a second end 1302 of the feeding part 13, and the grounding end 32 is electrically connected to the grounding element 4, so as to utilize the feeding element 3 to feed signals to the first radiating element 1, such that the first radiating element 1 is utilized to couple with and excites the second radiating element 2. Furthermore, through having the antenna structure U being electrically connected to the switching circuit S, when the switching circuit S is switched to the first mode, the antenna structure U generates the first operation bandwidth, and when the switching circuit S is switched to the second mode, the antenna structure U generates the second operation bandwidth, and the central frequency of the first operation bandwidth generated through the first mode is different from the another central frequency of the second operation bandwidth generated through the second mode, thereby adjusting the operation bandwidth generated by the antenna structure U.

Reference is further made to FIG. 1, for example, the first radiating part 11 of the first radiating element 1 can extend in a first direction (the positive X direction) relative to the feeding part 13, and the second radiating part 12 of the first radiating element 1 can extend in a second direction (the negative X direction) relative to the feeding part 13, and a length of the first radiating part 11 is longer than a length of the second radiating part 12. Moreover, the feeding part 13 can extend in a third direction (the negative Y direction) relative to a connecting junction between the feeding part 13 and the second radiating part 12. For example, the grounding part 14 can include a first section 141 that is connected to the first radiating part 11, a second section 142 that is connected to and turned relative to the first section 141, and a third section 143 that is connected to and turned relative to the second section 142. The first section 141 can extend in the third direction (the negative Y direction) relative to a connecting junction between the first section 141 and the first radiating part 11, the second section 142 can extend in the second direction (the negative X direction) relative to a connecting junction between the second section 142 and the first section 141, and the third section 143 can extend in the third direction (the negative Y direction) relative to a connecting junction between the third section 143 and the second section 142, but the present disclosure is not limited thereto. Therefore, the first radiating element 1 of the present disclosure can have a structure of a planar inverted-F antenna (PIFA), but the present disclosure is not limited thereto.

In the first embodiment, the first radiating part 11 of the first radiating element 1 and the main body 21 of the second radiating element 2 are coupled with each other, which can be utilized to mainly provide the operation bandwidth between 617 MHz and 960 MHz, and the second radiating part 12 can be utilized to mainly provide the operation bandwidth between 1700 MHz and 6000 MHz.

Figure 2:
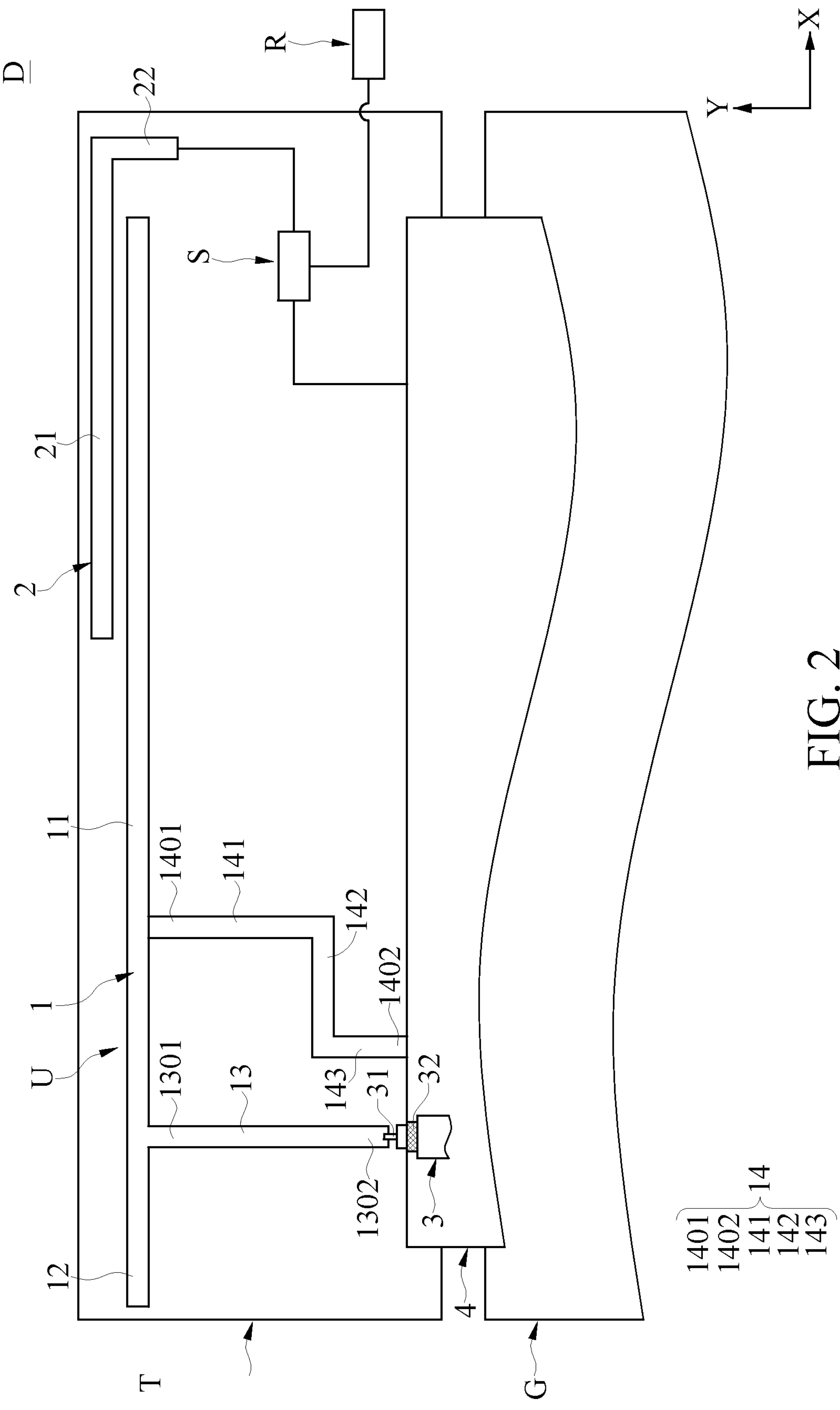
FIG. 2 is another top schematic view of the electronic device in the first embodiment of the present disclosure.
Figure 3:
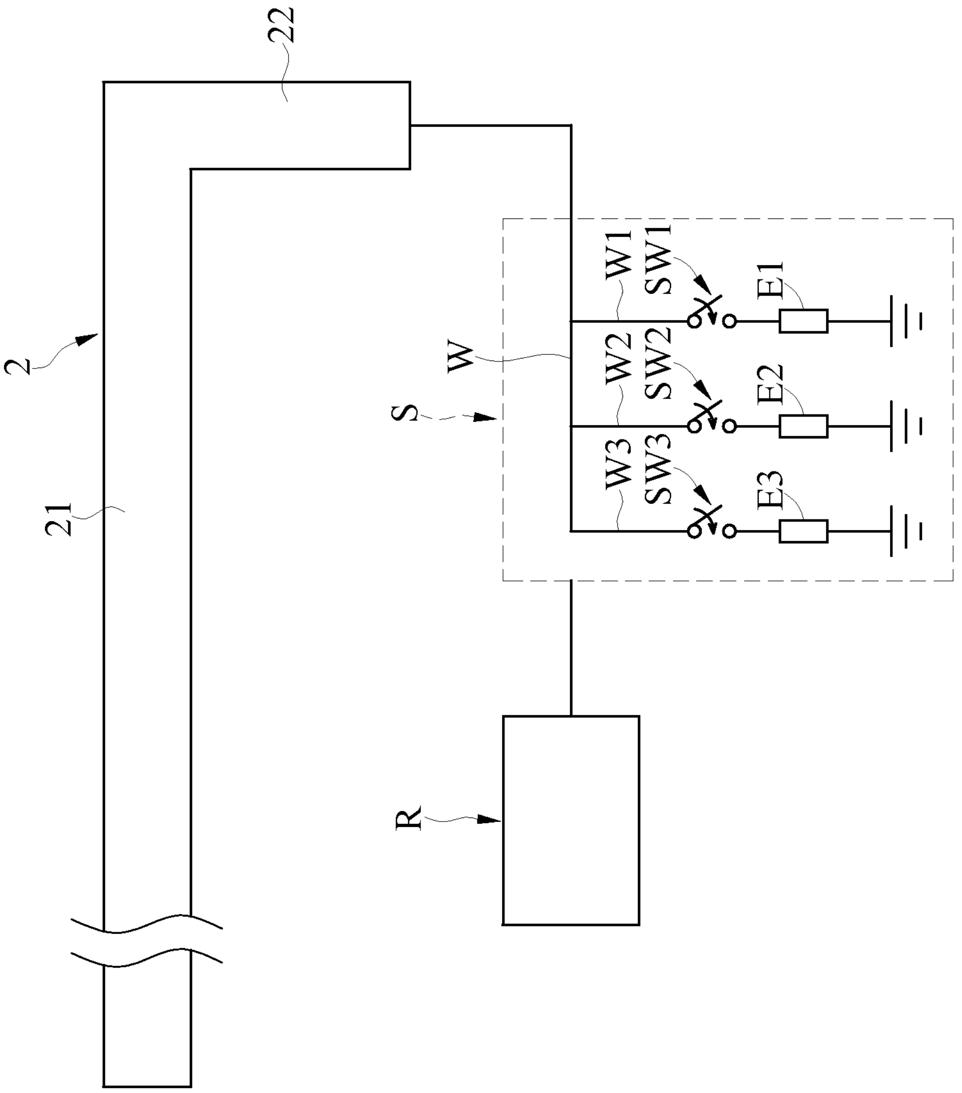
FIG. 3 is a schematic view showing a switching circuit, a control circuit, and a second radiating element in FIG. 2.

Moreover, reference is further made to FIG. 1, in conjunction with FIG. 2 and FIG. 3. FIG. 2 is another top schematic view of the electronic device in the first embodiment of the present disclosure. FIG. 3 is a schematic view showing a switching circuit, a control circuit, and a second radiating element in FIG. 2. In the first embodiment, the electronic device D can further include a control circuit R which is electrically connected to the switching circuit S, and the switching circuit S is electrically connected between the second radiating element 2 and the control circuit R. In addition, the control circuit R can control the switching circuit S to switch among various modes, such as between the first mode and the second mode, so as to utilize the control circuit R to control the operation bandwidth of the antenna structure U. For example, the control circuit R can be a microcontroller, or a circuit on a mainboard, so as to control the switching circuit S, but the present disclosure is not limited thereto.

As shown in FIG. 3, in one of the implementations of switching among modes, the switching circuit S includes a signal transmission path W and at least one grounding path (e.g., a first path W1, a second path W2, and/or a third path W3), and the at least one grounding path can be connected in series to a switch and a passive element (e.g., a first switch SW1, a second switch SW2, and/or a third switch SW3, and a first passive element E1, a second passive element E2, and/or a third passive element E3). One end of the signal transmission path W is electrically connected to the arm 22, and the at least one grounding path is electrically connected to the signal transmission path W. The first path W1, the second path W2, and/or the third path W3 can be respectively connected in series to the first passive element E1, the second passive element E2, and the third passive element E3. For example, the first passive element E1, the second passive element E2, and the third passive element E3 can each be an inductor, a capacitor, or a resistor, and the electronic device D can utilize the disposal of the first passive element E1, the second passive element E2, and/or the third passive element E3 to adjust the operation bandwidth, the impedance matching, the value of return loss, and/or the efficiency of the radiation generated by the antenna structure U. However, in other implementations, the grounding path can be disposed without any passive element. In addition, the signal transmission path W can be connected in series or in parallel to another passive element. Moreover, the control circuit R can be utilized to control whether or not the at least one grounding path is conducted, such that the selection of the grounding path can be used to control the switching circuit S to switch among various modes.

As shown in FIG. 3, in one of the implementations of switching among modes, the first mode is the arm 22 being electrically connected to the control circuit R, and the second mode is the arm 22 being electrically connected to the grounding element 4 through the first path W1. In this implementation, the first mode can refer to the second radiating element 2 being electrically connected to the control circuit R, and the first switch SW1 on the first path W1 being in a non-conducting state, such that the first path W1 is in an open-circuit state. Moreover, the second mode can refer to the second radiating element 2 being electrically connected to the control circuit R, and the first switch SW1 on the first path W1 being in a conducting state, such that the first path W1 is in a closed-circuit state. However, the present disclosure is not limited to the modes corresponding to the abovementioned paths.

Moreover, as shown in FIG. 3, another example is made to explain the different states of the different modes under the different paths (the signal transmission path W, the first path W1, the second path W2, and/or the third path W3) as follows. For example, the first path W1 and the second path W2 are respectively electrically connected to the signal transmission path W, the first passive element E1 is connected in series to the first path W1, and the second passive element E2 is connected in series to the second path W2. The first mode can refer to the arm 22 of the second radiating element 2 being electrically connected to the grounding element 4 through the first path W1, the second mode can refer to the arm 22 of the second radiating element 2 being electrically connected to the grounding element 4 through the second path W2, and the third mode can refer to the arm 22 of the second radiating element 2 being electrically connected to the control circuit R. In this implementation, the first mode can refer to the second radiating element 2 being electrically connected to the control circuit R, and the first switch SW1 on the first path W1 being in a conducting state, such that the second radiating element 2 is electrically connected to the grounding element 4 through the first path W1, and the second switch SW2 on the second path W2 being in a non-conducting state, such that the second path W2 is in an open-circuit state. In addition, the second mode can refer to the second radiating element 2 being electrically connected to the control circuit R, and the second switch SW2 on the second path W2 being in a conducting state, and the first switch SW1 on the first path W1 being in a non-conducting state. The third mode can refer to the second radiating element 2 being electrically connected to the control circuit R, and the first switch SW1 on the first path W1 and the second switch SW2 on the second path W1 being in a non-conducting state.

Reference is further made to FIG. 3, for example, in another one of the implementations of switching among modes, the first mode is the arm 22 being electrically connected to the control circuit R, the second mode is the arm 22 being electrically connected to the control circuit R, and the arm 22 can be electrically connected to the grounding element 4 through the first path W1 and the second path W2, respectively. That is to say, in the second mode, the first path W1, and the second path W2, can be conducted simultaneously. Therefore, the present disclosure is able to adjust the operation bandwidth, the impedance matching, the value of return loss, and/or the efficiency of the radiation generated by the antenna structure U through a selection among the fore-going grounding paths (the signal transmission path W, the first path W1, the second path W2, and/or the third path W3).

Figure 4:
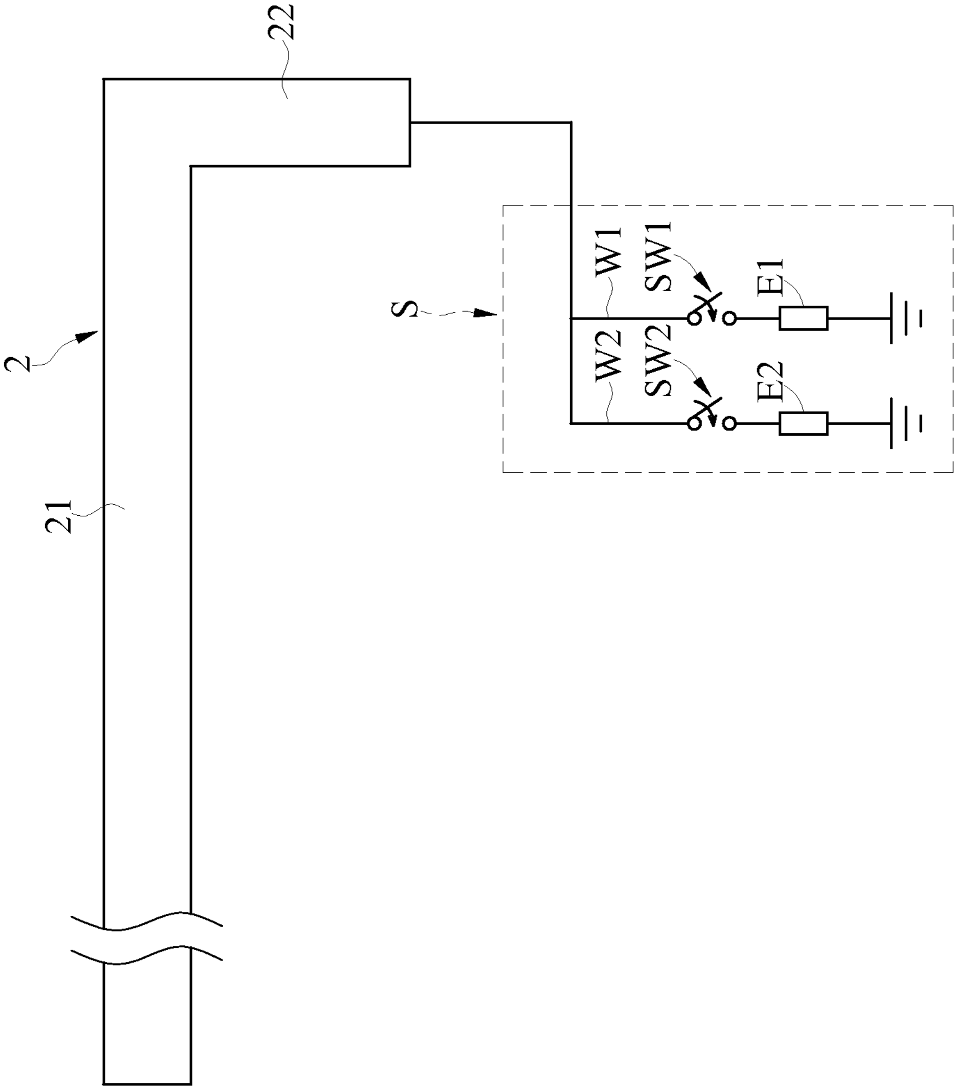
FIG. 4 is a schematic view showing the switching element and the second radiating element in FIG. 1.

As shown in FIG. 4, a circuit or a control element that is utilized to control the switching circuit S to switch to the first path W1 or the second path W2 can be integrated in the switching circuit S, so as to directly control the switching circuit S without any additional controls through the control circuit R, and the present disclosure is not limited to the specific implementation of the control circuit R and the method of controlling the conduction of the grounding paths.

References are further made to FIG. 1 to FIG. 4, for example, since the first radiating part 11 of the first radiating element 1 is disposed adjacent to the second radiating element 2, the modes (the first mode and/or the second mode) that are switched by the switching circuit S can be utilized to mainly adjust the central frequency of the operation bandwidth between 617 MHz and 960 MHz, but the present disclosure is not limited thereto. For example, the first passive element E1 on the first path W1 can be an inductor, the second passive element E2 on the second path W2 can be a capacitor. Furthermore, the first mode can refer to the first switch SW1 on the first path W1 being in a conducting state, and the second switch SW2 on the second path W2 being in a non-conducting state. In addition, the second mode can refer to the second switch SW2 on the second path W2 being in a conducting state, and the first switch SW1 on the first path W1 being in a non-conducting state. Therefore, when the first path W1 is in a conducting state and the second path W2 is in a non-conducting state, the central frequency of the operation bandwidth between 617 MHz and 960 MHz can be closer to 617 MHz, and when the first path W1 is in a non-conducting state and the second path W2 is in a conducting state, the central frequency of the operation bandwidth between 617 MHz and 960 MHz can be closer to 960 MHz, but the present disclosure is not limited thereto. In other words, a selection between the first passive element E1 and the second passive element E2 can be utilized to adjust the central frequency of the operation bandwidth.

Figure 5:
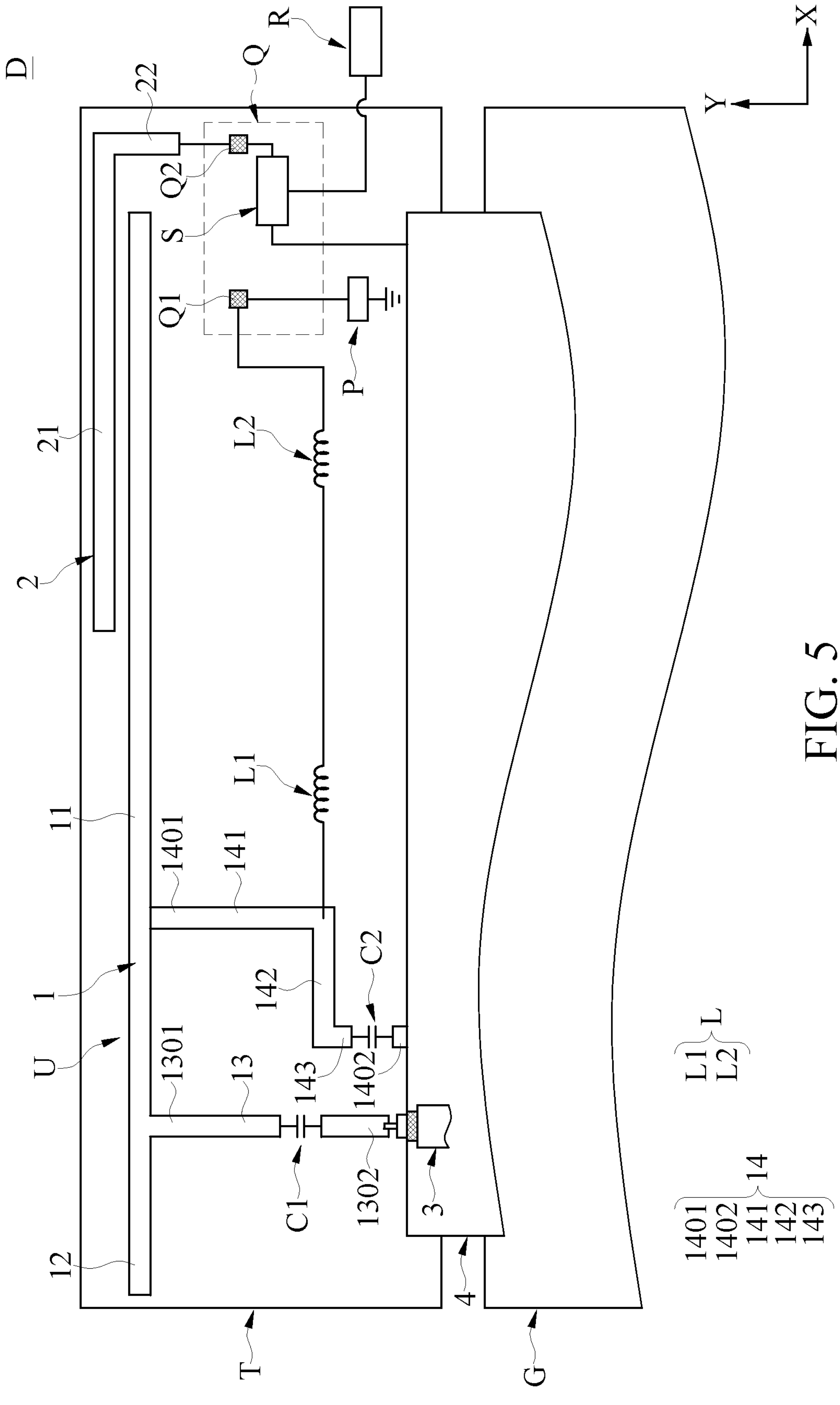
FIG. 5 is yet another top schematic view of the electronic device in the first embodiment of the present disclosure.

Reference is made to FIG. 5, which is yet another top schematic view of the electronic device in the first embodiment of the present disclosure. More preferably, the electronic device D can further include at least one inductor L and a proximity sensing circuit P. The at least one inductor L (such as a first inductor L1 and a second inductor L2) can be connected in series to a conducting path between the antenna structure U and the proximity sensing circuit P, and the proximity sensing circuit P can be electrically connected to the grounding element 4 directly or indirectly. In the first embodiment, the at least one inductor L can be connected in series to a conducting path between the first radiating element 1 and the proximity sensing circuit P. Through the disposal of the at least one inductor L and the proximity sensing circuit P, the electronic device D is able to sense whether or not a human body is adjacent to the antenna structure U, so as to adjust a radiation power of the antenna structure U to prevent the specific absorption rate (SAR) value per unit mass of an organism to electromagnetic wave energy from exceedingly high. Moreover, as shown in FIG. 5, the at least one inductor L can be connected in series to a conducting path between the grounding part 14 of the first radiating element 1 and the proximity sensing circuit P. However, in other implementations, the at least one inductor L can be connected in series to a conducting path between the feeding part 13 of the first radiating element 1 and the proximity sensing circuit P. Furthermore, although the proximity sensing circuit P shown in FIG. 5 can be grounded through other manners of grounding, the present disclosure is not limited to the manners of grounding of the proximity sensing circuit P.

Furthermore, the proximity sensing circuit P can be electrically connected to the control circuit R (not shown in figures), such that the control circuit R is able to adjust the radiation power of the antenna structure U through a signal sensed by the proximity sensing circuit P. However, in other implementations, a circuit or a control element utilized to receive a signal from the proximity sensing circuit P can be integrated in the proximity sensing circuit P, such that receiving the signal through the control circuit R is not additionally required. Therefore, the proximity sensing circuit P can be utilized to sense the distance between an object (such as body parts of a user) and the antenna structure U. Furthermore, the proximity sensing circuit P can be a capacitance sensing circuit and the first radiating element 1 can be regarded as a sensor electrode (a sensor pad), which can be utilized by the proximity sensing circuit P to measure the capacitance. Therefore, the control circuit R can determine whether or not the body parts of the user is within a predetermined detection range adjacent to the antenna structure U through a variation of the capacitance sensed by the proximity sensing circuit P. When the body parts of the user is positioned within a predetermined detection range, the control circuit R can decrease the radiation power of the antenna structure U to prevent the SAR value from being too high.

In addition, the proximity sensing circuit P can be integrated in the control circuit R, or the proximity sensing circuit P can also be integrated in the switching circuit S, and the present disclosure is not limit to the manner of configuring the switching circuit S, the proximity sensing circuit P, and the control circuit R. Moreover, as shown in FIG. 5, the switching circuit S is a part of a multifunctional integrated module Q, and the first radiating element 1 is electrically connected to a pin Q1 of the integrated module Q, and then electrically connected to the proximity sensing circuit P through the pin Q1 of the integrated module Q, and the proximity sensing circuit P is then grounded or electrically connected to the grounding element 4 to be grounded. In addition, the second radiating element 2 is electrically connected to a pin Q2 of the integrated module Q, and then electrically connected to the switching circuit S through the pin Q2 of the integrated module Q.

In addition, for example, the electronic device D can be disposed with a plurality of inductor L (the first inductor L1 and the second inductor L2) that is connected in series between the first radiating element 1 and the proximity sensing circuit P. One or more of the inductors L that are connected in series between the first radiating element 1 and the proximity sensing circuit P have a total induction greater than 15 nanohenries (nH).

More preferably, one or more of the inductors L are disposed adjacent to the grounding part 14 of the first radiating element 1, so as to prevent a transmission path connected between one or more of the inductors L and the grounding part 14 from being too long and forms a stub. Moreover, when two inductors L are disposed (the first inductor L1 and the second inductor L2), the first inductor L1 can be disposed adjacent to the grounding part 14 of the first radiating element 1, so as to prevent a transmission path connected between the first inductor L1 and the grounding part 14 from being too long and forms a stub. The second inductor L2 can be disposed adjacent to the proximity sensing circuit P, such that the second inductor L2 is positioned between the first inductor L1 and the proximity sensing circuit P. Therefore, one or more of the inductors L of the present disclosure can be utilized to prevent the antenna structure U and the proximity sensing circuit P from interfering with each other.

Reference is further made to FIG. 5. The antenna structure U can further include a first capacitor C1 and a second capacitor C2. The first capacitor C1 is connected in series to a conducting path between the feeding part 13 and the feeding end 31, and the second capacitor C2 is connected to a conducting path between the grounding part 14 and the grounding element 4. In addition, the second capacitor C2 can be connected in series to a conducting path between the second section 142 and the third section 143 of the grounding part 14, and an end of the at least one inductor L is connected to the first radiating element 1 at a connecting junction, which is positioned on the grounding part 14. For example, the connecting junction can be positioned between the second capacitor C2 and the first end 1401 of the grounding part 14, and in the first embodiment, the connecting junction can be positioned between the first section 141 and the second section 142, but the present disclosure is not limited thereto. Therefore, through the disposal of the first capacitor C1 and the second capacitor C2, the first radiating element 1, which is regarded as a sensor electrode (a sensor pad), can be prevented from being electrically connected to the grounding element 4 directly and affecting the proximity sensing circuit P. In addition, when the at least one inductor L is connected in series to the conducting path between the feeding part 13 of the first radiating element 1 and the proximity sensing circuit P, an end of the at least one inductor L can be connected to the first radiating element 1 at another connecting junction, which is positioned on the feeding part 13. For example, the another connecting junction can be positioned between the first capacitor C1 and the second radiating part 12.

Figure 6:
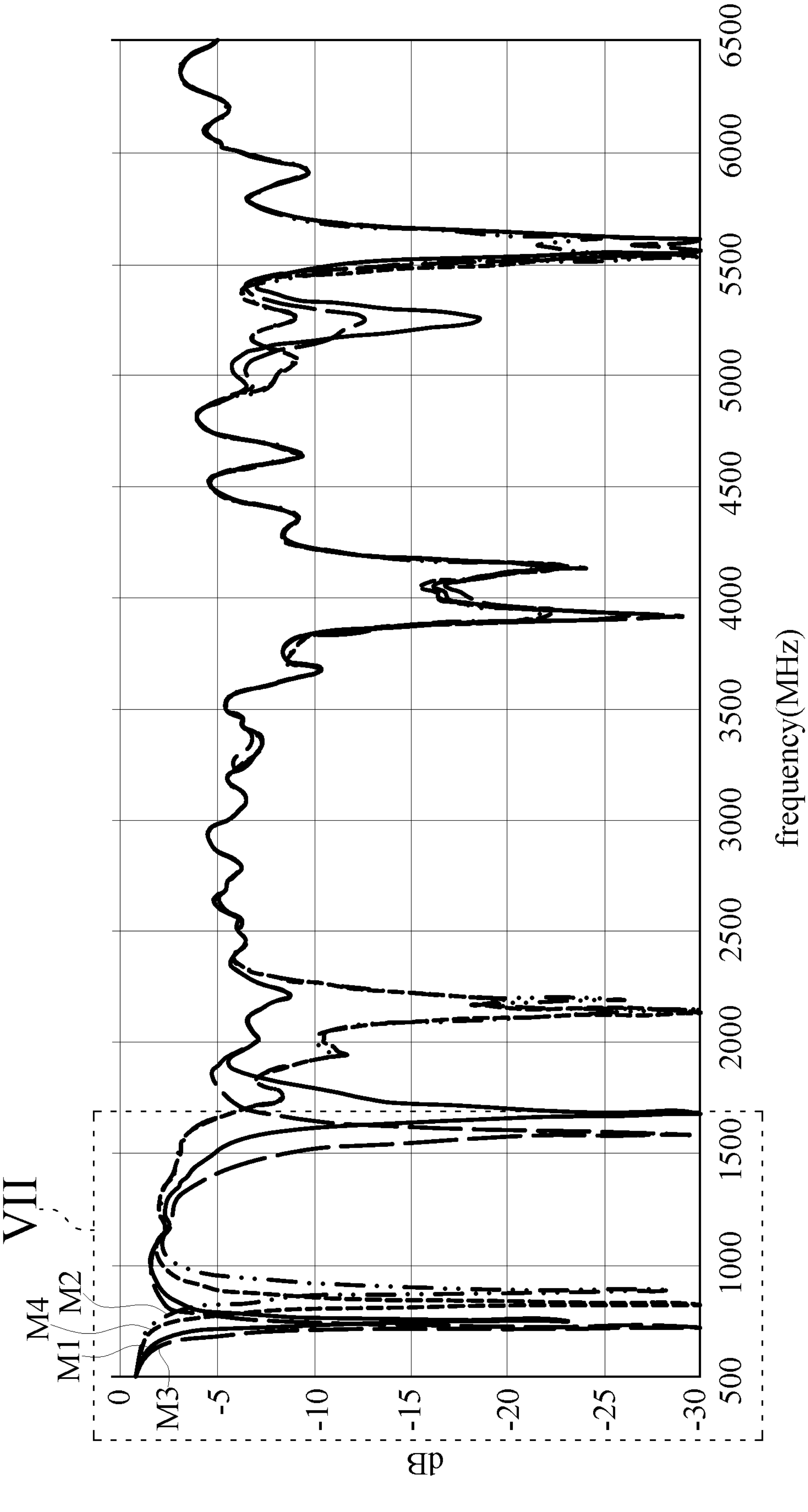
FIG. 6 is a curve diagram showing return losses of the second radiating element through different paths of the electronic device shown in FIG. 5.
Figure 7:
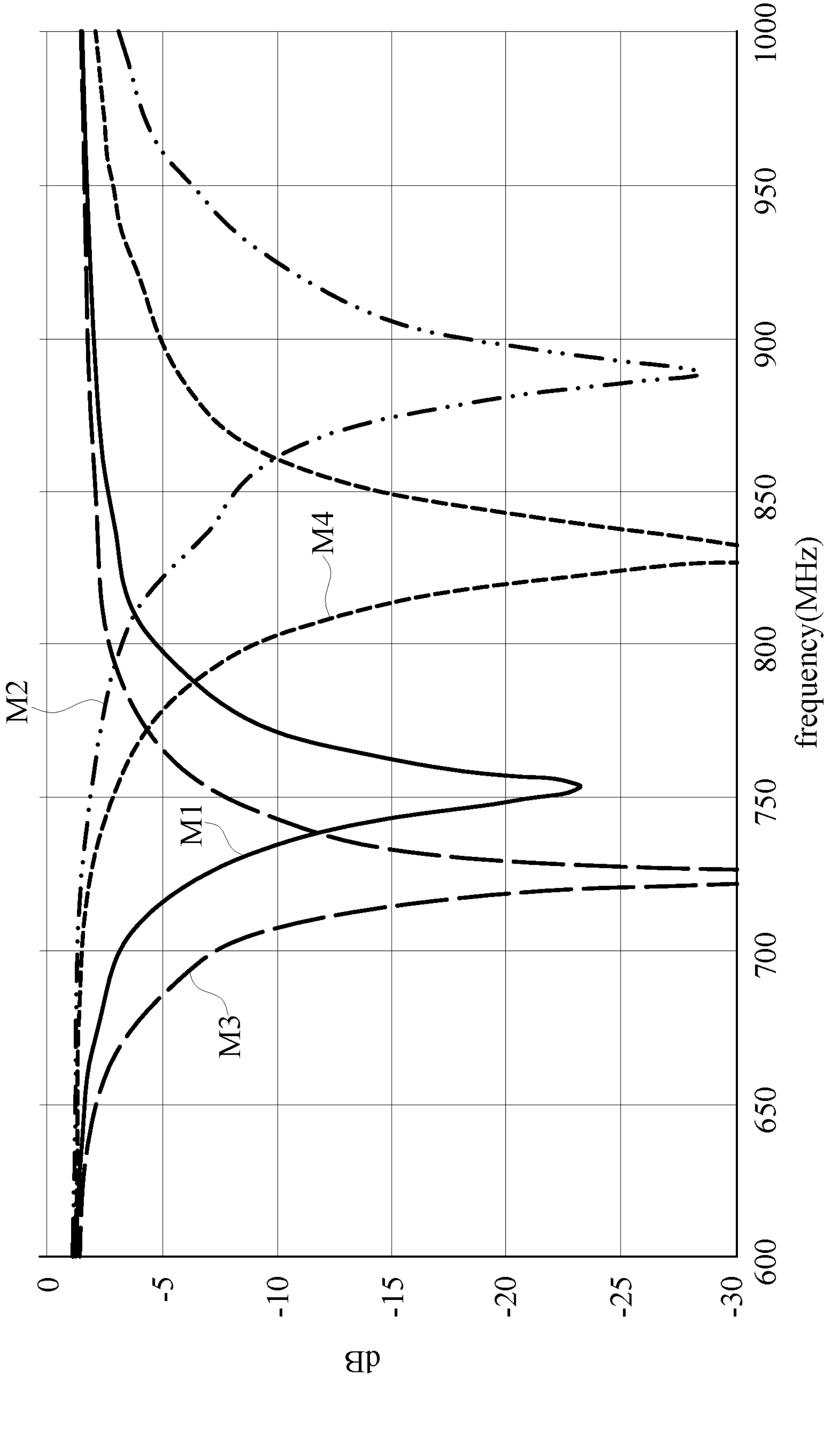
FIG. 7 is an enlarged partial view of part VII of FIG. 6.

References are further made to FIG. 2 and FIG. 3, in conjunction with FIG. 6 and FIG. 7. FIG. 6 is a curve diagram showing return losses of the second radiating element through different paths of the electronic device shown in FIG. 5. FIG. 7 is an enlarged partial view of part VII of FIG. 6. For example, the first passive element E1 that is connected in series on the first path W1 can be a capacitor of 6.8 picofarads (pF), the second passive element E2 that is connected in series on the second path W2 can be an inductor of 22 nH, and the second passive element E2 that is connected in series on the third path W3 can be a capacitor of 1.5 pF. In addition, a curve M1 shown in FIG. 6 and FIG. 7 is a return loss curve of the electronic device D under a condition of the first mode. In the first mode, the second radiating element 2 is electrically connected to the control circuit R, the first switch SW1 is in a conducting state, and the second switch SW2 and the third switch SW3 are in a non-conducting state. A curve M2 is under a condition of the second mode. In the second mode, the second radiating element 2 is electrically connected to the control circuit R, the second switch SW2 is in a conducting state, and the first switch SW1 and the third switch SW3 are in a non-conducting state. A curve M3 is under a condition of the third mode. In the third mode, the second radiating element 2 is electrically connected to the control circuit R, the third switch SW3 is in a conducting state, and the first switch SW1 and the second switch SW2 are in a non-conducting state. A curve M4 is under a condition of the fourth mode. In the fourth mode, the second radiating element 2 is electrically connected to the control circuit R, and the first switch SW1, the second switch SW2, and the third switch SW3 are in a non-conducting state. Therefore, as shown in FIG. 6 and FIG. 7, a selection among the different paths can be utilized to adjust the operation bandwidth, the impedance matching, the value of return loss, and/or the efficiency of the radiation generated by the antenna structure U. It should be noted that the switching circuit S of the present disclosure can be utilized to mainly adjust the central frequency of the operation bandwidth between 617 MHz and 960 MHz.

Second Embodiment

Figure 8:
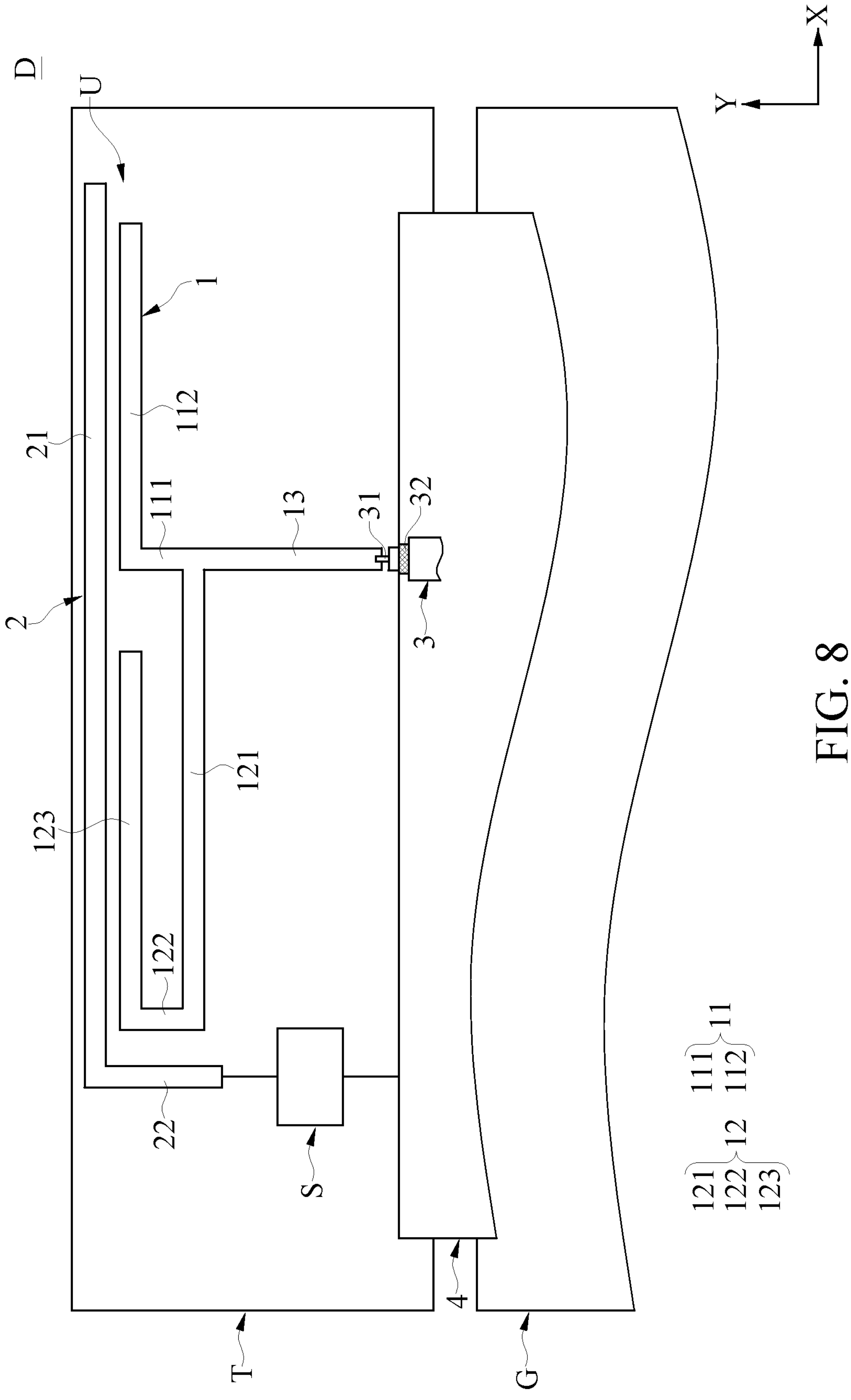
FIG. 8 is a top schematic view of the electronic device in a second embodiment of the present disclosure.

Reference is made to FIG. 8, which is a top schematic view of the electronic device in a second embodiment of the present disclosure. From comparing FIG. 8 and FIG. 1, it can be learned that the difference between the second embodiment and the first embodiment is the structure of antenna structure U. The electronic device D provided by the present disclosure can include the antenna structure U with a different structure. In addition, the antenna structure U provided by the second embodiment mainly provides an operation bandwidth between 617 MHz and 960 MHz and an operation bandwidth between 1700 MHz and 6000 MHz, but the present disclosure is not limited thereto. Moreover, other structures of the electronic device D provided by the second embodiment are the same as that of the first embodiment, and will not be reiterated herein.

The electronic device D includes the antenna structure U and a switching circuit S. The antenna structure U includes a first radiating element 1, a second radiating element 2, a feeding element 3, and a grounding element 4. The first radiating element 1 includes a first radiating part 11, a second radiating part 12, and a feeding part 13 that is electrically connected to the first radiating part 11 and the second radiating part 12. The second radiating element 2 is coupled with and separate from the first radiating element 1. The second radiating element 2 includes a main body 21 and an arm 22 that is electrically connected to the main body 21. The feeding element 3 includes a feeding end 31 and a grounding end 32, the feeding end 31 is electrically connected to the feeding part 13, and the grounding end 32 is electrically connected to the grounding element 4, so as to utilize the feeding element 3 to feed signals to the first radiating element 1, such that the first radiating element 1 is utilized to couple with and excites the second radiating element 2. Furthermore, the arm 22 is electrically connected to the switching circuit S, when the switching circuit S is switched to a first mode, the antenna structure U generates a first operation bandwidth, and when the switching circuit S is switched to a second mode, the antenna structure U generates a second operation bandwidth, and a central frequency of the first operation bandwidth generated through the first mode is different from another central frequency of the second operation bandwidth generated through the second mode. That is to say, the switching circuit S can be utilized to control the operation bandwidth of the antenna structure U.

In the second embodiment, the first radiating part 11 of the first radiating element 1 can extend in a first direction (the positive X direction) relative to the feeding part 13, and the second radiating part 12 of the first radiating element 1 can extend in a second direction (the negative X direction) relative to the feeding part 13. Moreover, the first radiating part 11 can include a first extending arm 111 that is connected to the feeding part 13 and extending in a fourth direction (the positive Y direction) relative to the feeding part 13, and a second extending arm 112 that is connected to the first extending arm 111 and extending in the first direction (the positive X direction) relative to the first extending arm 111. In addition, the second radiating part 12 can include a third extending arm 121 that is connected to the feeding part 13 and extending in a second direction (the negative X direction) relative to the feeding part 13, a fourth extending arm 122 that is connected to the third extending arm 121 and extending in the fourth direction (the positive Y direction) relative to the third extending arm 121, and a fifth extending arm 123 that is connected to the fourth extending arm 122 and extending in the first direction (the positive X direction) relative to the fourth extending arm 122. Furthermore, the second radiating element 2 can be disposed adjacent to the first radiating element 1, and the main body 21 of the second radiating element 2 can extend in the first direction (the positive X direction) relative to a connecting junction between the main body 21 and the arm 22, and the arm 22 extends in the third direction (the negative Y direction) relative to the connecting junction between the main body 21 and the arm 22. However, the present disclosure does not limit specific structures of the first radiating element 1 and the second radiating element 2.

Figure 9:
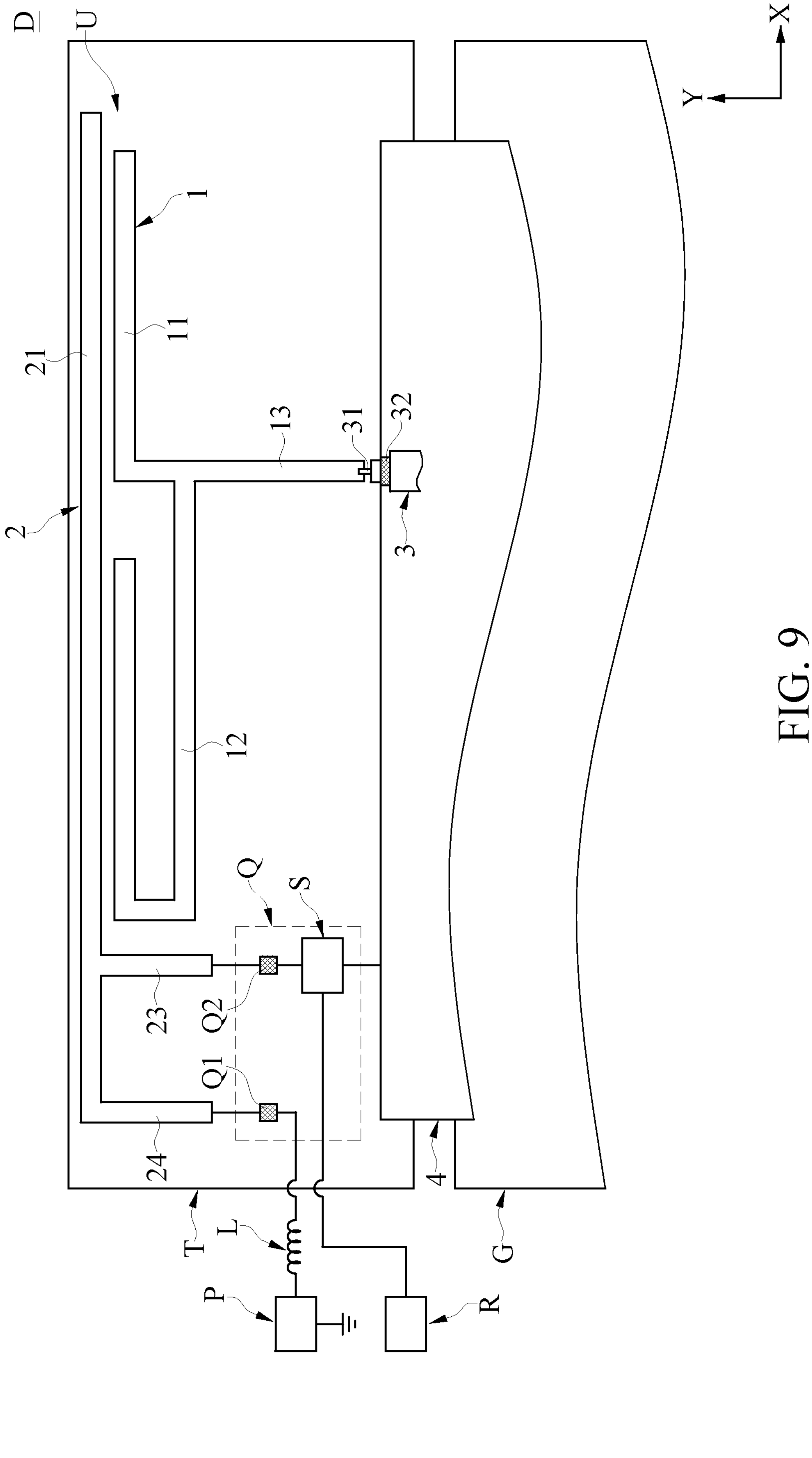
FIG. 9 is another top schematic view of the electronic device in the second embodiment of the present disclosure.

Reference is made to FIG. 9, which is another top schematic view of the electronic device in the second embodiment of the present disclosure. From comparing FIG. 9 and FIG. 8, the electronic device D shown in FIG. 9 can further include a proximity sensing circuit P and a control circuit R, and a structure of the second radiating element 2 is different from that shown in FIG. 8. The control circuit R can control the switching circuit S to switch among various modes, such as between a first mode and a second mode, such that the control circuit R can be utilized control the operation bandwidth of the antenna structure U, and that the proximity sensing circuit P can be utilized to provide the electronic device D with a function of sensing whether or not a human body becomes adjacent to the antenna structure U, thereby adjusting a radiation power of the antenna structure U and preventing a problem of the SAR value being too high. Moreover, as shown in FIG. 9, the switching circuit S can be a part of a multifunctional integrated module Q, the proximity sensing circuit P can be electrically connected to the integrated module Q and be electrically connected to the antenna structure U indirectly, and the control circuit R is electrically connected to the switching circuit S in the integrated module Q. However, although the electronic device D in FIG. 9 further includes the control circuit R to control the switching circuit S, in other implementations, a circuit or a control element that is used to control the switching circuit S to switch the modes of the electronic device D can be integrated in the switching circuit S to directly control the switching circuit S without any additional control through the control circuit R. Furthermore, the proximity sensing circuit P can also be electrically connected to the control circuit R (not shown in the figures), such that the control circuit R is able to adjust the radiation power of the antenna structure U according to a signal sensed by the proximity sensing circuit P. In the following, the electronic device D is exemplified as further including the control circuit R controlling the switching circuit S.

As shown in FIG. 9, the second radiating element 2 is coupled with the first radiating element 1, and the second radiating element 2 includes the main body 21, a first arm 23 that is electrically connected to the main body 21, and a second arm 24 that is electrically connected to the main body 21. The first arm 23 of the second radiating element 2 is electrically connected to the switching circuit S, and the second arm 24 of the second radiating element 2 is electrically connected to the proximity sensing circuit P, and one or more of the inductors L are connected in series between the second arm 24 and the proximity sensing circuit P. Moreover, the second arm 24 of the second radiating element 2 can be electrically connected to a pin Q1 of the integrated module Q and the proximity sensing circuit P is then grounded or electrically connected to the grounding element 4. In addition, the first arm 23 of the second radiating element 2 can be electrically connected to a pin Q2 of the integrated module Q. Furthermore, the proximity sensing circuit P can be a capacitance sensing circuit and the second radiating element 2 can be regarded as a sensor electrode (a sensor pad), which can be utilized by the proximity sensing circuit P to measure the capacitance. In addition, one or more of the inductors L that are connected in series between the second arm 24 of the second radiating element 2 and the proximity sensing circuit P have a total induction greater than 15 nanohenries (nH). One or more of the inductor L are disposed adjacent to the second arm 24 of the second radiating element 2, so as to prevent a transmission path connected between one or more of the inductors L and the second arm 24 from being too long and forms a stub. Furthermore, one or more of the inductors L can be elements of the integrated module Q.

Figure 10:
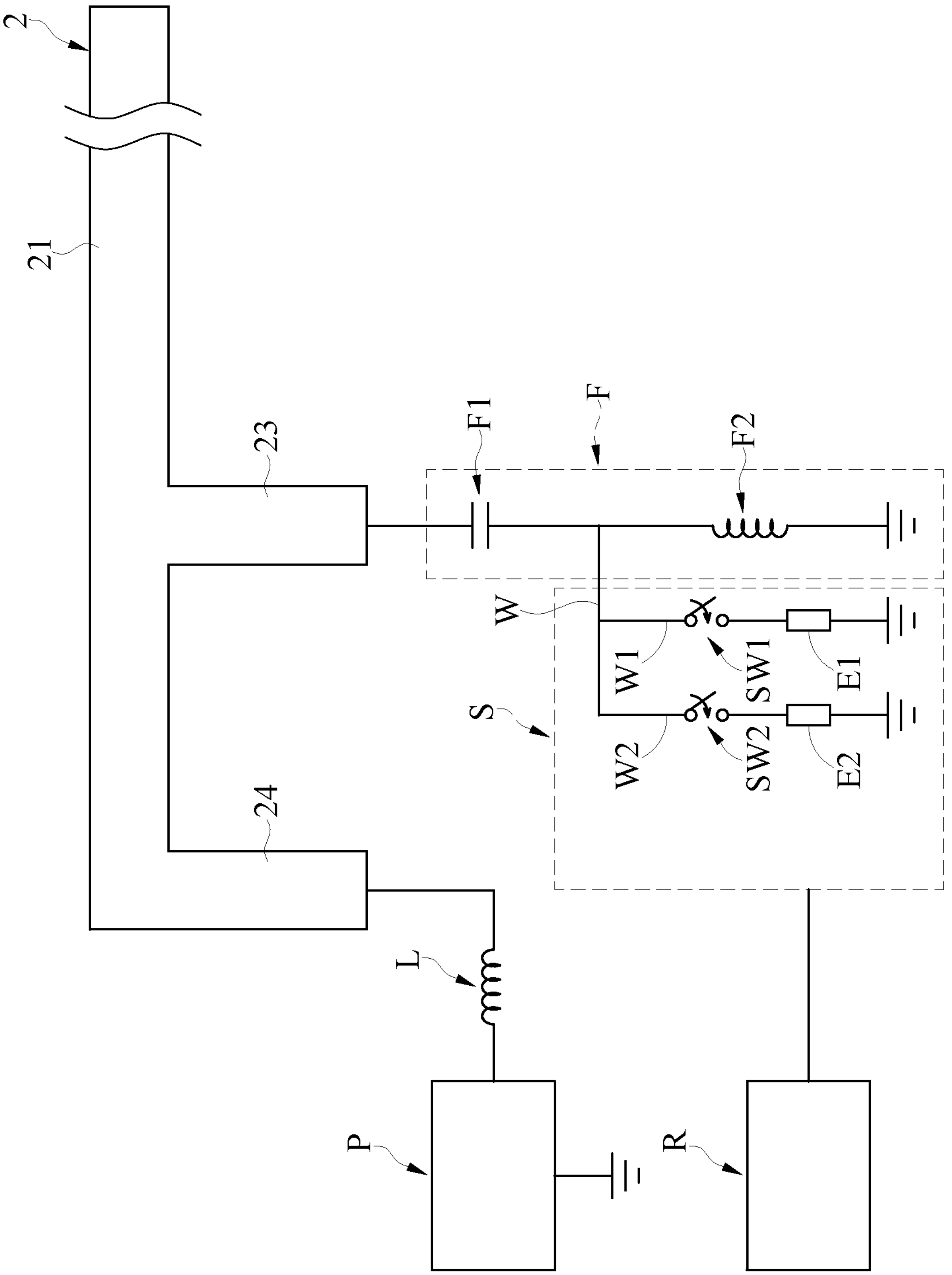
FIG. 10 is a schematic view of a switching circuit, a control circuit, a proximity sensing circuit and a second radiating element of the electronic device in the second embodiment of the present disclosure.

Reference is further made to FIG. 9, in conjunction with FIG. 10. FIG. 10 is a schematic view of a switching circuit, a control circuit, a proximity sensing circuit and a second radiating element of the electronic device in the second embodiment of the present disclosure. More preferably, the electronic device D can further include a filter circuit F, the filter circuit F is electrically connected to the switching circuit S and the second radiating element 2 of the antenna structure U, such that the filter circuit F is utilized to block the interference between the antenna structure U and the switching circuit S. For example, the filter circuit F can be a high-pass filter (HPF); in addition, as shown in FIG. 10, the filter circuit F can be connected in series between the first arm 23 and the grounding element 4, and the filter circuit F includes a capacitor F1 and an inductor F2. One end of the capacitor F1 is electrically connected to the first arm 23, another end of the capacitor F1 is electrically connected to an end of the inductor F2, and another end of the inductor F2 is electrically connected to the grounding element 4.

In one of the implementations of switching among modes, the switching circuit S includes a signal transmission path W and at least one grounding path (such as a first path W1 and/or a second path W2), and the at least one grounding path can be connected in series to a switch and a passive element (such as a first switch SW1 and/or a second switch SW2, and a first passive element E1 and/or a second passive element E2).

Furthermore, one end of the signal transmission path W of the switching circuit S is electrically connected to a connecting junction between the capacitor F1 and the inductor F2, the switching circuit S is electrically connected to the first arm 23 through the first capacitor F1. As shown in FIG. 10, the first path W1 and the second path W2 can be connected parallel to the inductor F2 of the filter circuit F, and the control circuit R is electrically connected to the switching circuit S, so as to control whether or not the first path W1 and/or the second path are conducted.

The control circuit R can control the switching circuit S to switch among various modes, such as between the first mode and the second mode. For example, the switching circuit S includes the first path W1 and the second path W2, the first mode can refer to the first arm 23 being electrically connected to the grounding element 4 through the first path W1, the second mode can refer to the first arm 23 being electrically connected to the grounding element 4 through the second path W2, and the first passive element E1 is connected in series to the first path W1, the second passive element E2 is connected in series to the second path W2.

In other implementations, the first mode can refer to the second radiating element 2 being electrically connected to the control circuit R, and the first switch SW1 on the first path W1 and the second switch SW2 on the second path W2 being in a non-conducting state. The second mode can also be the second radiating element 2 being electrically connected to the control circuit R, and the first switch SW1 on the first path W1 and the second switch SW2 on the second path W2 being in a conducting state. In other words, whether or not the different grounding paths (the first path W1 and/or the second path W2) of the present disclosure are conducted can be utilized to switch between one of the various modes.

Figure 11:
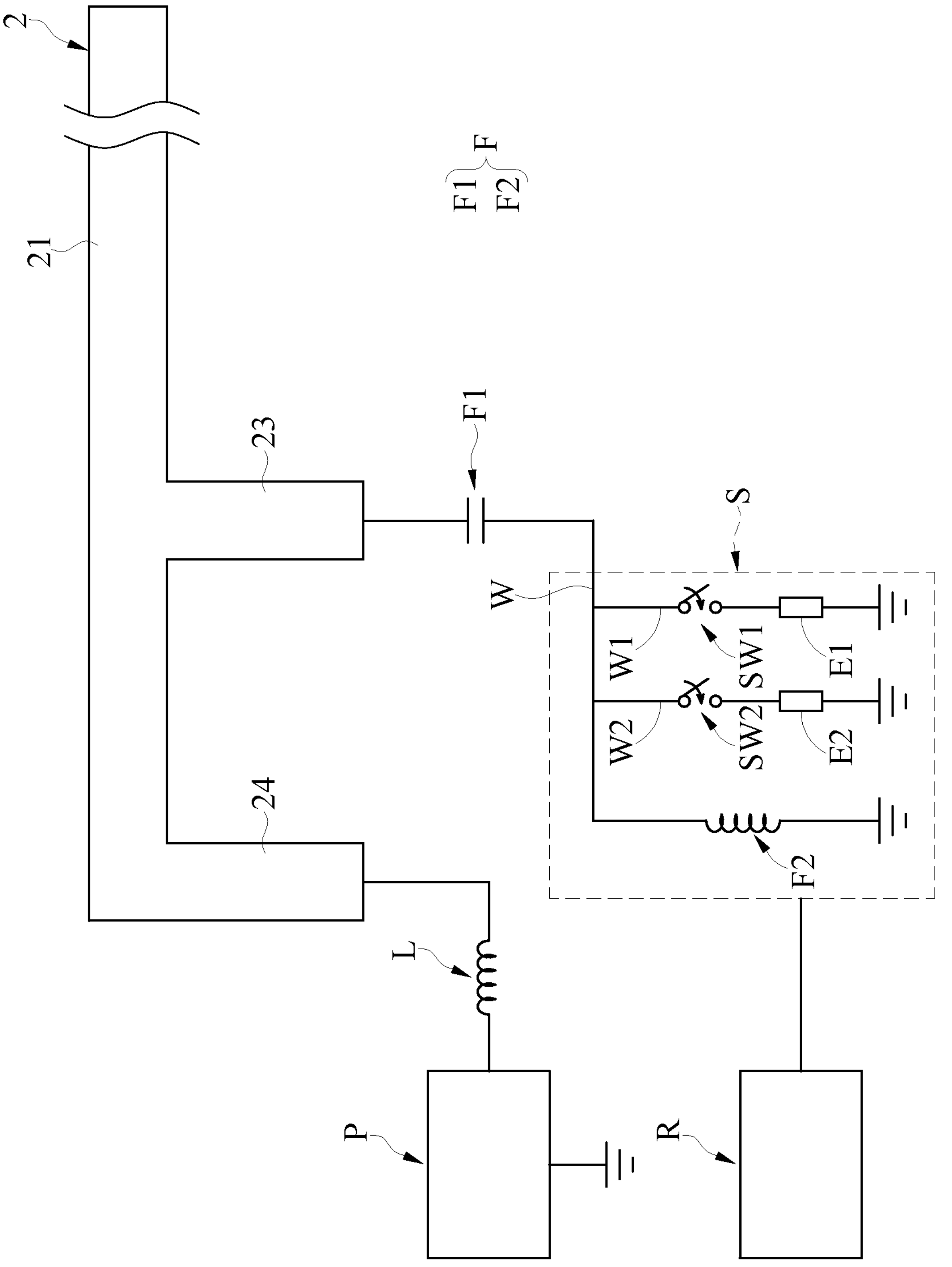
FIG. 11 is another schematic view of the switching circuit, the control circuit, the proximity sensing circuit and the second radiating element of the electronic device in the second embodiment of the present disclosure.
Figure 12:
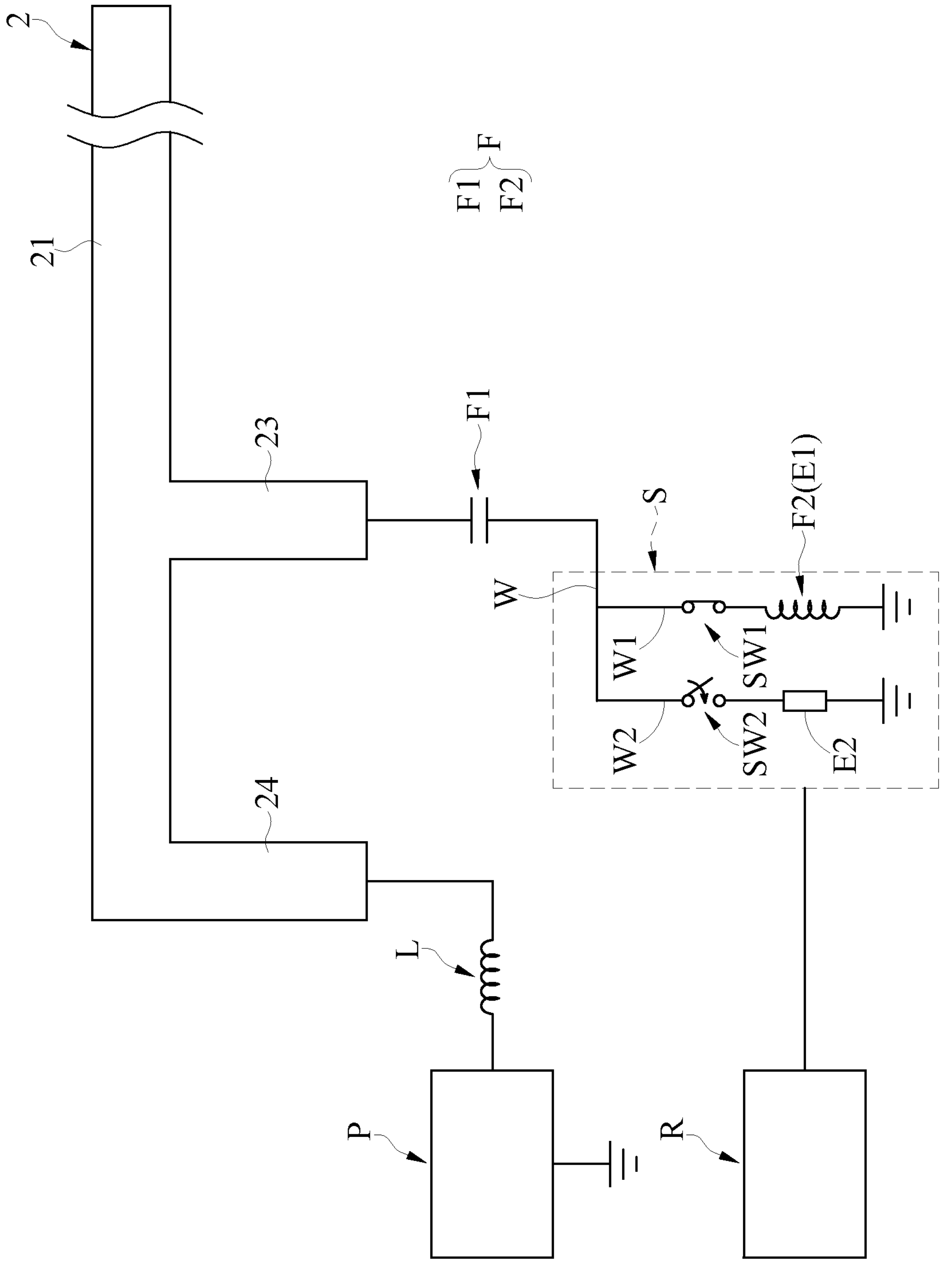
FIG. 12 is yet another schematic view of the switching circuit, the control circuit, the proximity sensing circuit and the second radiating element of the electronic device in the second embodiment of the present disclosure.

References are further made to FIG. 9 and FIG. 10, in conjunction with FIG. 11 and FIG. 12. FIG. 11 and FIG. 12 are schematic views of the switching circuit, the control circuit, the proximity sensing circuit and the second radiating element of the electronic device in the second embodiment of the present disclosure. From comparing FIG. 11 and FIG. 10 it can be learned that, in FIG. 11, the position where the inductor F2 of the filter circuit F is disposed can be adjusted. Moreover, an end of the capacitor F1 of the filter circuit F is electrically connected to the first arm 23, another end of the capacitor F1 is electrically connected to an end of the signal transmission path W, an end of the inductor F2 of the filter circuit F is electrically connected to the signal transmission path W, and another end of the inductor F2 of the filter circuit F is electrically connected to the grounding element 4.

As shown in FIG. 12, the inductor F2 of the filter circuit F can be the first passive element E1 on the first path W1; that is to say, the inductor F2 of the filter circuit F can be integrated in the switching circuit S. In addition, as shown in FIG. 12, the first switch SW1 on the first path W1 is in a conducting state, such that the inductor F2 on the first path W1 can be conducted to be grounded. In addition, as shown in FIG. 12, the first mode can refer to the second radiating element 2 being electrically connected to the control circuit R, and the second switch SW2 on the second path W2 is in a conducting state. The second mode can refer to the second radiating element 2 being electrically connected to the control circuit R, and the second switch SW2 on the second path W2 is in a non-conducting state, but the present disclosure is not limited thereto.

Figure 13:
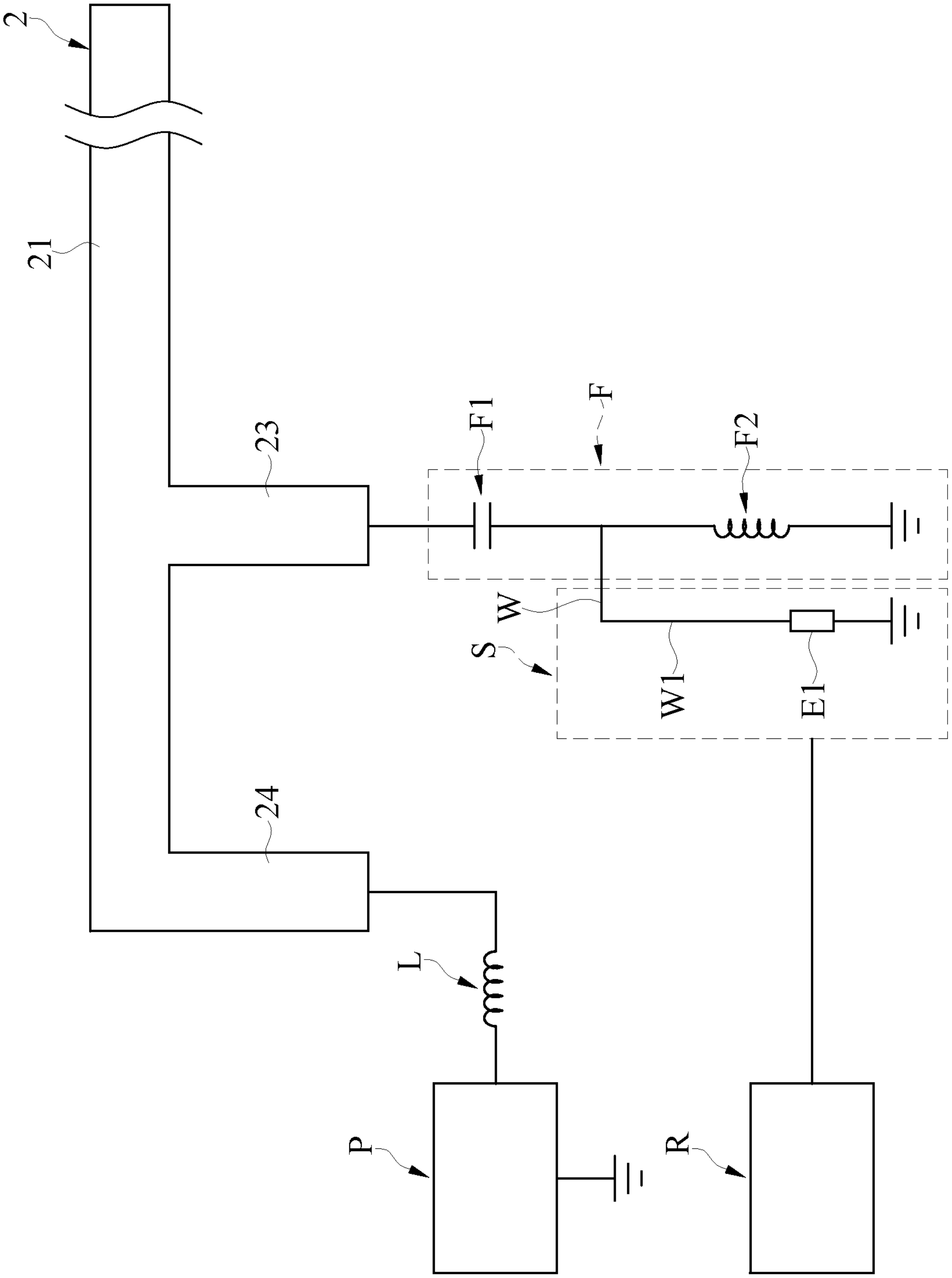
FIG. 13 is still another schematic view of the switching circuit, the control circuit, the proximity sensing circuit and the second radiating element of the electronic device in the second embodiment of the present disclosure.
Figure 14:
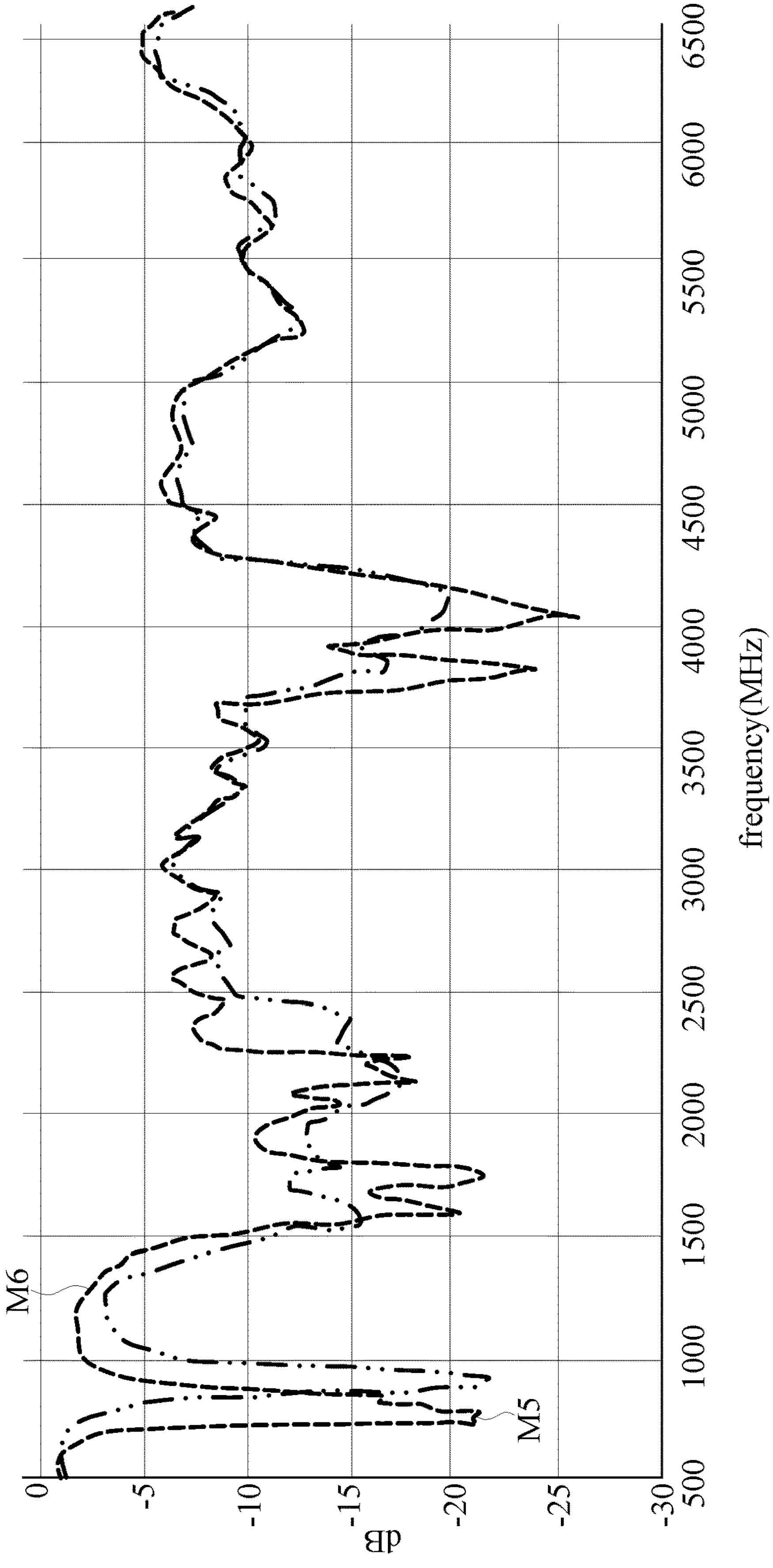
FIG. 14 is a curve diagram showing return losses of the second radiating element through different paths of the electronic device shown in FIG. 13.

References are made to FIG. 13 and FIG. 14. FIG. 13 is still another schematic view of the switching circuit, the control circuit, the proximity sensing circuit and the second radiating element of the electronic device in the second embodiment of the present disclosure. FIG. 14 is a curve diagram showing return losses of the second radiating element through different paths of the electronic device shown in FIG. 13. In FIG. 13, without including the second path W2, the switch circuit S can have the first path W1 grounded directly, the first passive element E1 can be disposed to be connected in series to the conducting path of the first path W1.

As mentioned above, the capacitor F1 of the filter circuit F can have a capacitance of 82 pF, the inductor F2 of the filter circuit F can have an induction of 33 nH, the first passive element E1 can be a resistor having a resistance of zero ohms (Ω). Moreover, a curve M5 in FIG. 14 is the return loss curve of the electronic device D under a condition of the first mode, and a curve M6 is the return loss curve of the electronic device D under a condition of the second mode. Therefore, as shown in FIG. 14, the electronic device D provided by the present disclosure is able to adjust the operation bandwidth, the impedance matching, the value of return loss, and/or the efficiency of radiation generated by the antenna structure U through selecting from different paths and/or changing the capacitance of the variable capacitor.

One of the advantages of the present disclosure is that the electronic device D is able to adjust the operation bandwidth, the impedance matching, the value of return loss, and/or the efficiency of radiation generated by the antenna structure U through the technical solutions of "the arm 22 of the antenna structure U being electrically connected to the switching circuit S", and "when the switching circuit S is switched to the first mode, the antenna structure U generating the first operation bandwidth, when the switching circuit S is switched to the second mode, the antenna structure U generating the second operation bandwidth, and the central frequency of the first operation bandwidth generated through the first mode being different from the another central frequency of the second operation bandwidth generated through the second mode".

In addition, the present disclosure is able to utilize the technical solution of "the antenna structure U being electrically connected to the proximity sensing circuit P, and the at least one inductor L being connected in series between the antenna structure U and the proximity sensing circuit P" to sense whether or not a human body is adjacent to the antenna structure U of the electronic device D, so as to adjust the radiation power of the antenna structure U to prevent the SAR value from being too high.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An electronic device, comprising:

an antenna structure including:

a first radiating element including a first radiating part, a second radiating part, a feeding part, and a grounding part, a first end of the feeding part being electrically connected to the second radiating part, and a first end of the grounding part being electrically connected to the first radiating part;

a second radiating element coupled with the first radiating element, the second radiating element including a main body and an arm electrically connected to the main body;

a feeding element including a feeding end and a grounding end, the feeding end being electrically connected to a second end of the feeding part; and a grounding element electrically connected to the grounding end, and a second end of the grounding part being electrically connected to the grounding element; and a switching circuit, the arm being electrically connected to the switching circuit, and the switching circuit being grounded, wherein, when the switching circuit is switched to a first mode, the antenna structure generates a first operation bandwidth, wherein, when the switching circuit is switched to a second mode, the antenna structure generates a second operation bandwidth, and wherein a central frequency of the first operation bandwidth generated through the first mode is different from another central frequency of the second operation bandwidth generated through the second mode;

at least one inductor and a proximity sensing circuit, wherein the at least one inductor is connected in series between the first radiating element and the proximity sensing circuit, an end of the at least one inductor is connected to the first radiating element at a connecting junction, a capacitor is connected in series between the grounding part and the grounding element, the connecting junction is positioned on the grounding part, and the connecting junction is positioned between the capacitor and the first end of the grounding part.

2. The electronic device according to claim 1, wherein another capacitor is connected in series between the feeding part and the feeding end.

3. The electronic device according to claim 2, wherein the first radiating part of the first radiating element and the main body of the second radiating element are separated from and coupled with each other.

4. The electronic device according to claim 3, wherein the at least one inductor that is connected in series between the first radiating element and the proximity sensing circuit has a total inductance greater than 15 nanohenries (nH).

5. The electronic device according to claim 1, wherein the switching circuit includes a signal transmission path and a first path, an end of the signal transmission path is electrically connected to the arm, the first path is electrically connected to the signal transmission path, and a first passive element is connected to the first path in series;

wherein the first mode is the first path being in a non-conducted state, and the second mode is the first path being in a conducted state.

6. The electronic device according to claim 1, wherein the switching circuit includes a first path and a second path, the first mode is the arm being electrically connected to the grounding element through the first path, the second mode is the arm being electrically connected to the grounding element through the second path, and the first path is connected to a first passive element in series, and the second path is connected to a second passive element in series.

* * * * *